US007606233B2

(12) United States Patent
Canning et al.

(10) Patent No.: US 7,606,233 B2
(45) Date of Patent: Oct. 20, 2009

(54) METHOD FOR MICRO-CONTROLLER AND DSP BASED DATA COMMUNICATION WITHIN A TRANSCEIVER

(75) Inventors: Noel Charles Canning, Munich (DE); Norman Goris, Dortmund (DE); Harald Oliver Morzinek, Rosstal (DE); Wolfgang Scheit, Rothenbach (DE)

(73) Assignee: Agere Systems Inc., Allentown, PA (US)

( * ) Notice: Subject to any disclaimer, the term of this patent is extended or adjusted under 35 U.S.C. 154(b) by 1083 days.

(21) Appl. No.: 10/379,332

(22) Filed: Mar. 4, 2003

(65) Prior Publication Data
US 2003/0179728 A1   Sep. 25, 2003

(30) Foreign Application Priority Data
Mar. 25, 2002   (EP)   ................... 02006793

(51) Int. Cl.
*H04L 12/28* (2006.01)
(52) U.S. Cl. ............... 370/394; 370/412; 370/428; 455/73
(58) Field of Classification Search ................ 370/313, 370/328, 412, 392, 394, 428; 455/73
See application file for complete search history.

(56) References Cited

U.S. PATENT DOCUMENTS

| 4,399,531 | A | * | 8/1983 | Grande et al. ............... 370/216 |
| 4,984,266 | A | * | 1/1991 | Smith ..................... 379/399.02 |
| 5,305,308 | A | * | 4/1994 | English et al. .............. 370/335 |
| 6,101,598 | A | * | 8/2000 | Dokic et al. ................ 712/227 |
| 6,230,255 | B1 | * | 5/2001 | Asghar et al. ................ 712/32 |
| 6,282,238 | B1 | * | 8/2001 | Landry ....................... 375/222 |
| 6,496,481 | B1 | * | 12/2002 | Wu et al. .................... 370/242 |
| 6,532,225 | B1 | * | 3/2003 | Chang et al. ................ 370/341 |
| 6,590,902 | B1 | * | 7/2003 | Suzuki et al. ............... 370/465 |
| 6,594,398 | B1 | * | 7/2003 | Wu et al. .................... 382/245 |
| 6,611,592 | B1 | * | 8/2003 | Sato et al. ............. 379/374.01 |
| 6,658,027 | B1 | * | 12/2003 | Kramer et al. .............. 370/516 |
| 6,754,223 | B1 | * | 6/2004 | Lussier et al. ............... 370/412 |
| 6,910,134 | B1 | * | 6/2005 | Maher et al. .................. 726/24 |
| 6,987,770 | B1 | * | 1/2006 | Yonge, III .................... 370/401 |
| 7,006,634 | B1 | * | 2/2006 | Batcher ....................... 380/261 |
| 7,009,967 | B1 | * | 3/2006 | Hariharasubrahmanian . 370/389 |
| 7,075,891 | B2 | * | 7/2006 | Hu et al. ...................... 370/236 |
| 7,076,432 | B1 | * | 7/2006 | Cheah et al. ................. 704/500 |
| 7,164,904 | B2 | * | 1/2007 | Nagy et al. .................. 455/403 |
| 7,187,663 | B2 | * | 3/2007 | Schmidt ...................... 370/313 |
| 7,215,345 | B1 | * | 5/2007 | Hanko ......................... 345/620 |

(Continued)

OTHER PUBLICATIONS

Integrated Circuit Technologies for Wireless Communications; Book Series; The International Series in Engineering and Computer Science; vol. 524; Wireless Multimedia Network Technologies; Publisher Springer Copyright 1999.*

(Continued)

*Primary Examiner*—Edan Orgad
*Assistant Examiner*—Salman Ahmed

(57) ABSTRACT

The present invention provides a method for improved data communication and a transceiver employing the method. In one embodiment, the method includes generating data blocks to transmit to a second transceiver, generating identification data for the data blocks and identifying the data blocks transmitted to the second transceiver based on the identification data.

13 Claims, 2 Drawing Sheets

U.S. PATENT DOCUMENTS

| | | | | |
|---|---|---|---|---|
| 7,230,945 | B2* | 6/2007 | Yeom | 370/352 |
| 2001/0036173 | A1* | 11/2001 | Shmulevich et al. | 370/352 |
| 2002/0146128 | A1* | 10/2002 | Mauro et al. | 380/270 |
| 2002/0163918 | A1* | 11/2002 | Cline | 370/399 |
| 2003/0142629 | A1* | 7/2003 | Krishnamurthi et al. | 370/249 |
| 2003/0179728 | A1* | 9/2003 | Canning et al. | 370/328 |
| 2004/0013089 | A1* | 1/2004 | Taneja et al. | 370/235 |
| 2004/0158790 | A1* | 8/2004 | Gaal et al. | 714/748 |
| 2007/0066275 | A1* | 3/2007 | Nagy et al. | 455/403 |
| 2007/0111718 | A1* | 5/2007 | Palum et al. | 455/418 |

OTHER PUBLICATIONS

Low power DSP's for wireless communications (embedded tutorial session); International Symposium on Low Power Electronics and Design archive Proceedings of the 2000 international symposium on Low power electronics and design table of contents Rapallo, Italy; pp. 303-310; Year of Publication: 2000.*

Electronic and Information Engineering Department (DIEI)—University of Perugia—Italy. Apr. 2001; A Software Radio OFDM Transceiver for WLAN applications Euro Sereni; Silvia Culicchi; Vanni Vinti; Enrica Luchetti; Simone Ottaviani; Michele Salvi.*

Software radio: The challenges for reconfigurable terminals; La radio logicielle: Les enjeux pour des terminaux reconfigurables Journal Annals of Telecommunications; Publisher Springer Paris; Issue vol. 57, Nos. 7-8 / Jul. 2002.*

* cited by examiner

METHOD FOR MICRO-CONTROLLER AND DSP BASED DATA COMMUNICATION WITHIN A TRANSCEIVER

CROSS-REFERENCE TO FOREIGN APPLICATION

This application claims the benefit of EP Patent Application No. 02006793.0 entitled "A Method for Improved Data Communication Due to Improved Data Processing Within a Transceiver" to Noel Charles Canning, et al., filed on Mar. 25, 2002, which is incorporated herein by reference.

TECHNICAL FIELD OF THE INVENTION

The present invention is directed, in general, to data communications systems and, more specifically, to a transceiver having improved data processing.

BACKGROUND OF THE INVENTION

Methods for improving the speed and security of data transmissions via modern data networks, such as an Integrated Services Digital Network (ISDN), a Global Standard for Mobile Communications (GSM) network, a General Packet Radio Service (GPRS) network or a Public Switched Packet Data Network (PSPDN), such as the Internet and X:25 networks are well known. Yet, state of the art improvement methods often struggle with a conflict between increasing security or speed. Thus, an improvement in security in most cases results in a reduction of speed.

For example, a data transmission scheme may be implemented via a wireless GPRS network. A wireless GPRS network is a type of packet-switched radio network that employs multiplexed data blocks of transmission frames that are serially ordered and transmitted in accordance with a transmission protocol over a shared link. A GPRS transmission procedure, for example operating in a confirmation mode, typically retransmits faulty transmitted data blocks of a transmission frame from a mobile station to a base station until a correct receipt of the respective data blocks is acknowledged. The re-transmitting is usually limited by a certain number of retries or a certain amount of time. After reaching the re-transmitting limit, a more secure but also slower coding of the transmission frame data is chosen. Thus, it could be that for a single outstanding data block, an entire transmission frame of data has to be transmitted again using better coding but at a slower rate.

Moreover, the GPRS is a multi-slot application running in dynamic allocation mode with tight requirements for reaction time. The mobile station, or transceiver, therefore, has to react within a short time period after receiving an Uplink State Flag (USF) from the base station to transmit the data blocks. Typically, the USF is provided separately for each timeslot with the timing constraint for the USF managed by a Digital Signal Processor (DSP). The speed, therefore, of data transmission between the micro-controller and the DSP within a transceiver is quite crucial.

Accordingly, what is needed in the art is an improved method of data transmission that increases both the speed and the security of modern data networks.

SUMMARY OF THE INVENTION

To address the above-discussed deficiencies of the prior art, the present invention provides a method for improved data communication and a transceiver employing the method. In one embodiment, the method includes a transceiver (e.g., a first transceiver) generating data blocks to transmit to another transceiver (e.g., a second transceiver). The method also includes generating identification data for the data blocks identifying the data blocks to be transmitted to the second transceiver based on the identification data.

In an advantageous embodiment of the method, the second transceiver transmits acknowledgment signals with the identification data to a receiving buffer of the first transceiver. A Digital Signal Processor (DSP) coupled to the receiving buffer provides the acknowledgment signals with the identification data to a micro-controller to indicate a transmission status of the data blocks. The combination of both the identification data and the acknowledgments assist in determining a beginning and end, or vice versa, of the data blocks transmission thereby increasing the security of data transmission.

In another aspect, the present invention provides a transceiver (e.g., a first transceiver) for transmitting data blocks. The first transceiver includes a micro-controller configured to generate the data blocks to transmit to another transceiver (e.g., a second transceiver) and generate identification data for the data blocks. The first transceiver also includes a DSP configured to receive the data blocks from the micro-controller and provide, to the micro-controller, the identification data associated with the data blocks transmitted to the second transceiver. Since the micro-controller generates the identification data, a clear identification of the data blocks which have already been transmitted and an identification of which data blocks still have to be sent to the DSP may be achieved.

The foregoing has outlined preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
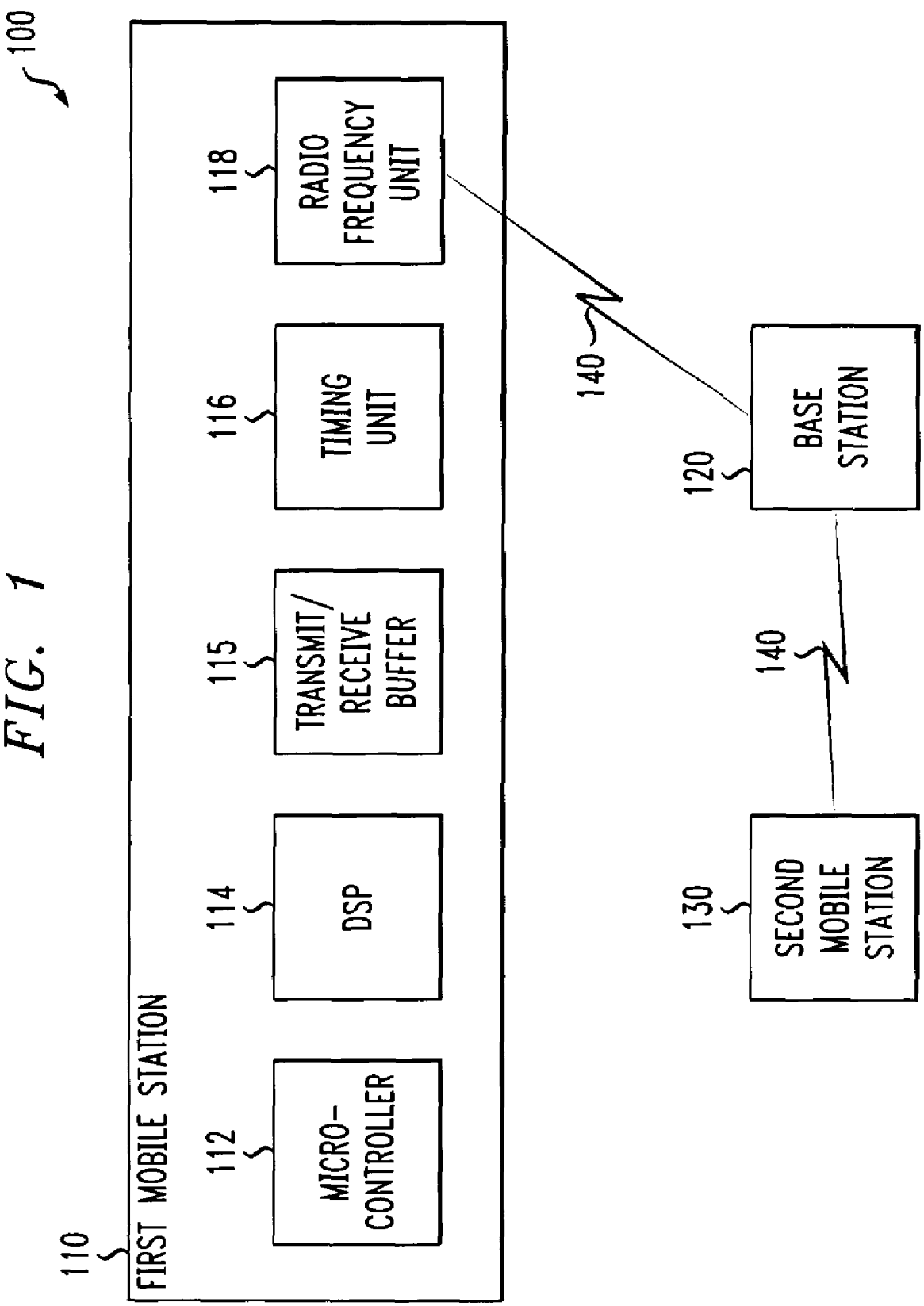
FIG. 1 illustrates a block diagram of a data communications system constructed in accordance with the principles of the present invention.

Referring initially to FIG. 1, illustrated is a network diagram of a data communications system, generally designated 100, constructed in accordance with the principles of the present invention. In addition to a first mobile station 110, the data communications system 100 includes a base station 120, a second mobile station 130 and an air interface 140. The first mobile station 110 includes a micro-controller 112, a digital signal processor (DSP) 114, a transmit/receive buffer 115, a timing unit 116 and a radio frequency unit 118. In a general sense, the first and second mobile stations 110, 130, are examples of transceivers constructed in according to the principles of the present invention.

The data communications system 100 may be a data packet-switched radio network. In a preferred embodiment, the data communications system 100 may be a General Packet Radio Service (GPRS) network. Of course, one skilled in the art will understand that the data communications system 100 may be a Integrated Services Digital Network (ISDN), a Global System for Mobile communications (GSM) network or a Public Switched Packet Data Network (PSPDN), such as the Internet and X:25 networks.

The first mobile station 110 and the second mobile station 130 may be mobile telephones. The second mobile station 130 may operate similar to and be configured similar to the first mobile station 110. The micro-controller 112 and the DSP 114 may include conventional microprocessor circuitry and conventional DSP circuitry commonly employed in data communication devices. The transmit/receive buffer 115 may be a standard buffer configured to buffer data blocks to transmit and data blocks that are received.

The timing unit 116 and the radio frequency unit 118 may include standard components of mobile stations operating in a data communications system. The timing unit 116 may be configured to control the radio frequency unit 118 to provide the proper timing for data transmission over the air interface 140. The timing for data transmission may be synchronized and conform to GSM specifications for multi-slot applications. The radio frequency unit 118 may be configured to transmit and receive data blocks via the air interface 140. For example, the radio frequency unit 118 may include an antenna. The radio frequency unit 118 may transmit and receive data blocks to/from the base station 120 or directly to the second mobile station 130. The base station 120 may include standard base station systems that are configured to operate within a data communications system.

In one embodiment, data blocks may be passed from the micro-controller 112 to the DSP 114 wherein the data blocks are stored until transmitted. The time for transmission may be determined by specific messages received via the air interface 140. When the time for transmission has been determined, the DSP 114 sends the data blocks to the transmit/receive buffer 115 and sends a request to the micro-controller 112 to send a next data block for transmission. The data blocks are transmitted over the air interface 140 via the radio frequency unit 118 which is controlled by the timing unit 116.

The data blocks to be transmitted may be sent from the micro-controller 112 to the DSP 114 in advance of transmission to insure timing requirements of a multi-slot network are fulfilled. In a GPRS multi-slot application running in a dynamic allocation mode, there are tight requirements for reaction time when transmitting data. The first mobile station 110 may have to react within ten (10) timeslots (i.e., 10*577 µs) after having received, for example, an Uplink State Flag (USF) from the base station 120 indicating the time to transmit data. A USF may be provided separately for each timeslot. In the first mobile station 110, the DSP 114 may process the USF to satisfy the reaction time since the data blocks to be transmitted are passed in advance to the DSP 114 wherein they are stored until transmission.

Each of the data blocks may be passed from the micro-controller 112 to the DSP 114 with an associated identification data which may be generated or selected freely by the micro-controller 112. In an advantageous embodiment, the micro-controller 112 may choose the identification data to be an index of lists or data packages to be transmitted. Each data list which may be transmitted may carry the index such that the processing of the lists, particularly between the micro-controller 112 and the DSP 114, is eased.

The base station 120 may send the USF to the first mobile station 110 to start transmission of the data blocks and indicate via which channel or slot to use for transmission. The micro-controller 112 may receive acknowledgments, such as ACKs, indicating how many and which of the data blocks were transmitted. The acknowledgments may by a data message, such as DataACK, which includes the identification data of the transmitted data blocks.

Since the identification data has been generated by the micro-controller 112, the identification data may be used for various purposes such as for managing lists containing the next data blocks to be transmitted. Additionally, contents of an identification data byte may be free and can be used for such purposes as carrying an index of a list of data blocks to be transmitted. The index may ease list management and assist in safely determining the transmitted data blocks.

Figure 2:
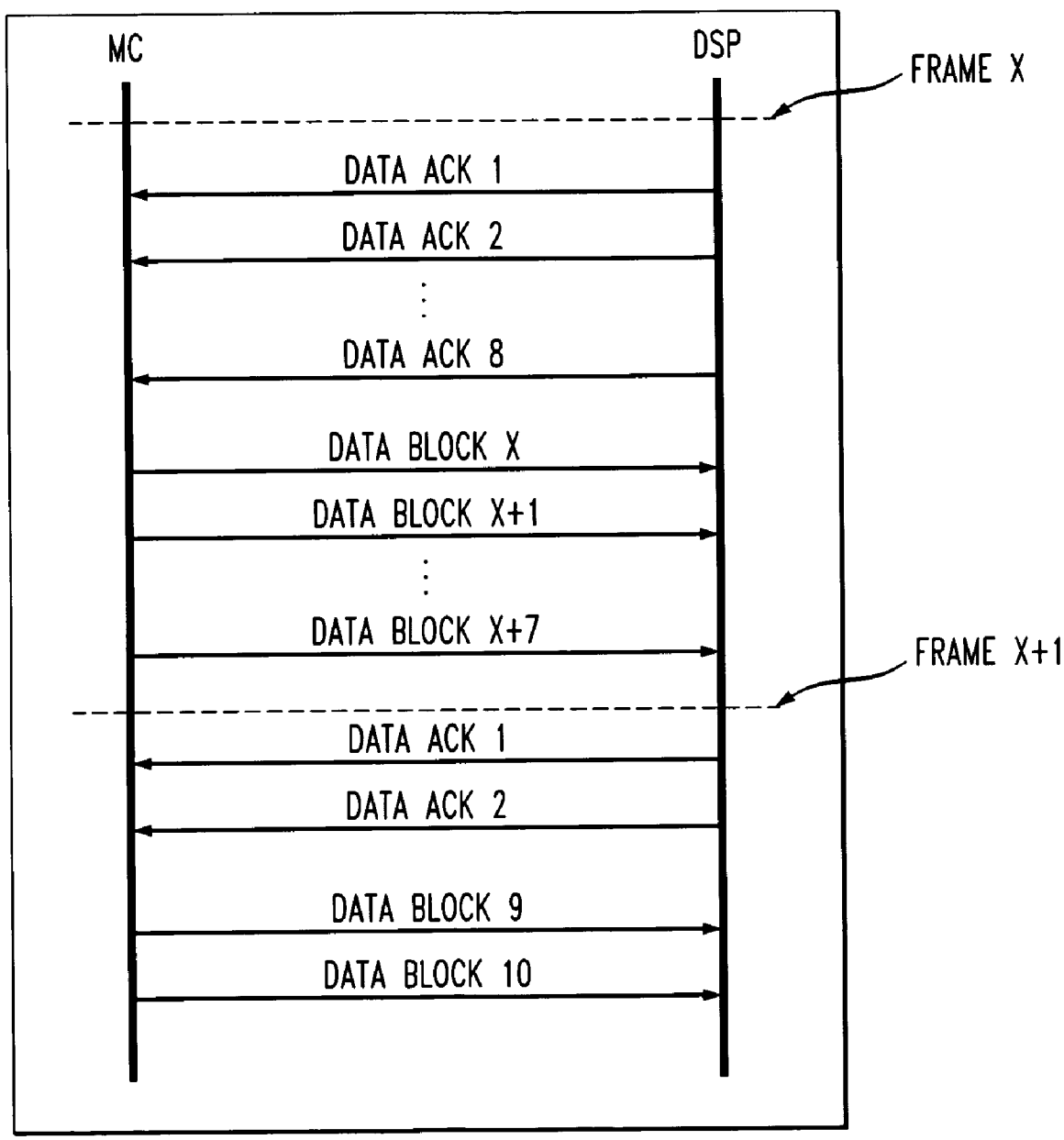
FIG. 2 illustrates a flow diagram of an embodiment of a method for improved data communication constructed in accordance with the principles of the present invention.

Turning now to FIG. 2, illustrated is a flow diagram of an embodiment of a method for improved data communication constructed in accordance with the principles of the present invention. More specifically, the flow diagram provides an example of a message exchange between a micro-controller, designated MC in FIG. 2, and a DSP of a transceiver such as the first mobile station 110 of FIG. 1.

For example, in a Frame X, eight (8) data blocks are acknowledged and hence eight (8) new blocks may be sent from the micro-controller to the DSP. In Frame X+1, two (2) data blocks are acknowledged and two (2) new data blocks may be sent to the DSP from the micro-controller. Of course one skilled in the art will understand that the acknowledgment sent to the micro-controller may be a negative acknowledgment signal.

This interleaved communication between the micro-controller and the DSP may result in an improvement of security of transmission and in an acceleration in speed for transmitting the data blocks. The present invention, therefore, advantageously provides during communication between the micro-controller and the DSP, a possibility that data blocks of a data package or a data list which relates to a data frame may be mixed with or incorporated into other data packages or data lists that are not yet fully transmitted. Thus, data frames may be provided that are filled with a maximum number of data blocks which may be transmitted. Consequently, transmission of an entire frame containing the data blocks which were not transmitted, may not be needed. Thus, the interleaving data management may improve efficiency of buffering during data communication which is especially important within multi-slot applications with tight time constraints.

Although the present invention has been described in detail, those skilled in the art should understand that they can make various changes, substitutions and alterations herein without departing from the spirit and scope of the invention in its broadest form.

What is claimed is:

1. A method for transmitting data, comprising:
   generating data blocks of a data package in a first transceiver to transmit to a second transceiver, said first transceiver including a micro-controller coupled to a digital signal processor;
   generating identification data in said first transceiver for said data blocks, wherein said generating said data blocks and said identification data is performed by said micro-controller;
   sending said data blocks and said identification data from said micro-controller to said digital signal processor in advance of transmission of said data blocks;

storing said data blocks and said identification data in said digital signal processor until time for said transmitting;

transmitting said data blocks with said identification data in data frames to said second transceiver;

identifying a transmission status of said data blocks transmitted to said second transceiver based on receiving said identification data in return from said second transceiver;

transmitting acknowledgment signals with said identification data from said second transceiver to a receiving buffer of said first transceiver; and providing said acknowledgment signals with said identification data to said micro-controller via said digital signal processor to indicate said transmission status of said data blocks, wherein a number of data blocks sent to said digital signal processor from said micro-controller is based on a number of said acknowledgment signals received from said second transceiver.

2. The method according to claim 1 further comprising providing an interleaved communication between said micro-controller and said digital signal processor.

3. The method according to claim 1 further comprising generating and transmitting data blocks of multiple data packages and choosing said identification data to be indexes of said multiple data packages to be transmitted.

4. The method according to claim 1 wherein said transmitting is via a multi-slot network and is triggered by an Uplink State Flag from a base station that indicates which slot of said multi-slot network to use for said transmitting of said data blocks.

5. A transceiver capable of transmitting data blocks, comprising:

a micro-controller configured to generate data blocks to transmit to a second transceiver and generate identification data for said data blocks, wherein said identification data is an index of a list of said data blocks to be transmitted and each of said data blocks is transmitted with said index;

a digital signal processor configured to receive said data blocks from said micro-controller, store said data blocks until time for said transmit and determine said time for said transmit based on a received message, said digital signal processor further configured to provide, to said micro-controller, said identification data that has been returned from said second transceiver after being transmitted thereto with said data blocks, said micro-controller further configured to employ said returned identification data to determine which of said data blocks were transmitted to said second transceiver; and a receiving buffer configured to receive acknowledgment signals and said identification data from said second transceiver and send said acknowledgment signals and said identification data from said second transceiver to said digital signal processor, wherein a number of data blocks sent by said micro-controller to said digital signal processor is equivalent to a number of said acknowledgment signals received by said receiving buffer.

6. The transceiver according to claim 5 further comprising a timing unit for said data blocks.

7. The transceiver according to claim 5 wherein said transceiver is configured to operate in a General Packet Radio Service (GPRS) network.

8. The transceiver according to claim 5 wherein said transceiver is a mobile station.

9. The transceiver according to claim 5 wherein said micro-controller is configured to provide said data blocks to transmit to said digital signal processor.

10. The transceiver according to claim 7 wherein said micro-controller is configured to provide data blocks of different data packages and said transceiver is configured to transmit said data blocks of different packages via a data frame.

11. The transceiver according to claim 5 wherein said micro-controller is configured to interleavedly communicate with said digital signal processor.

12. The transceiver according to claim 5 wherein said micro-controller employs said index to manage transmission of said data blocks.

13. A transceiver, comprising:

a micro-controller configured to generate at least one data block and identification data associated with said data block, wherein said identification data is an index of a list of said data blocks to be transmitted;

a digital signal processor configured to receive said data block and said identification data from said micro-controller and store said data block until time of transmission to comply with timing requirements of a General Packet Radio Service (GPRS) network, said time of transmission determined by said digital signal processor based on a message received by said transceiver; and a transmit/receive buffer configured to receive said data block and information data from said digital signal processor for transmission to another transceiver and receive an acknowledgment signal and said information data from said another transceiver, wherein said digital signal processor is configured to send said data block and said information data at said time of transmission to said transmit/receive buffer and send a request to said micro-controller for another data block to be transmitted, said information data including an index of data blocks to be transmitted, said micro-controller further configured to receive said acknowledgment signal and said information data from said transmit/receive buffer and determine a transmission status of said data block based thereon.

* * * * *